United States Patent
Melekian et al.

(10) Patent No.: US 10,738,887 B2
(45) Date of Patent: Aug. 11, 2020

(54) SHIFT FORK AND METHOD OF MANUFACTURE

(71) Applicant: ArvinMeritor Technology, LLC, Troy, MI (US)

(72) Inventors: Joseph Melekian, Rochester Hills, MI (US); Nagaraja S. Gargeshwari, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 128 days.

(21) Appl. No.: 15/889,346

(22) Filed: Feb. 6, 2018

(65) Prior Publication Data

US 2019/0242476 A1 Aug. 8, 2019

(51) Int. Cl.
*F16H 63/32* (2006.01)

(52) U.S. Cl.
CPC ....... *F16H 63/32* (2013.01); *F16H 2063/321* (2013.01); *F16H 2063/327* (2013.01)

(58) Field of Classification Search
CPC ............... F16H 63/32; F16H 2063/327; F16H 2063/321; F16H 2063/322; F16H 2063/324; F16H 2063/325; F16H 2063/328
See application file for complete search history.

(56) References Cited

U.S. PATENT DOCUMENTS

| | | | | |
|---|---|---|---|---|
| 1,585,935 A | * | 5/1926 | Muncy | F16H 63/32 74/559 |
| 1,947,988 A | * | 2/1934 | Hedgeland | F16H 59/042 74/473.1 |
| 2,962,914 A | * | 12/1960 | Peras | F16H 63/32 74/473.26 |
| 3,242,759 A | * | 3/1966 | Magg | F16H 63/36 74/473.25 |
| 4,273,004 A | * | 6/1981 | Morrison | F16H 59/042 74/473.12 |
| 4,275,613 A | * | 6/1981 | Worner | F16H 63/38 267/158 |
| 4,495,831 A | * | 1/1985 | Takahashi | F16H 63/32 192/113.5 |
| 4,529,080 A | * | 7/1985 | Dolan | F16H 63/32 192/109 A |
| 4,548,253 A | * | 10/1985 | Funatani | B22D 19/02 164/105 |

(Continued)

FOREIGN PATENT DOCUMENTS

| | | |
|---|---|---|
| CN | 101007378 A | 8/2007 |
| CN | 101346570 A | 1/2009 |

(Continued)

OTHER PUBLICATIONS

European Patent Office, Extended European Search Report for European Application No. 18212204.4-1012, dated Jun. 19, 2019.

(Continued)

*Primary Examiner* — Howard J Sanders
*Assistant Examiner* — Gregory T Prather
(74) *Attorney, Agent, or Firm* — Brooks Kushman PC (57) ABSTRACT

A shift fork and a method of manufacture. The shift fork may be made by bending a rod to form a first prong, a second prong, and a ring portion. First and second intermediate segments of the rod may extend from the ring portion to the first and second prongs, respectively.

20 Claims, 4 Drawing Sheets

(56) References Cited

U.S. PATENT DOCUMENTS

| | | | | |
|---|---|---|---|---|
| 5,027,672 | A * | 7/1991 | Salvatori | F16H 63/32 192/82 R |
| 5,094,121 | A * | 3/1992 | von Kaler | F16H 3/083 74/335 |
| 5,743,147 | A * | 4/1998 | Gazyakan | F16H 63/206 74/473.25 |
| 5,799,540 | A * | 9/1998 | Diehl | F16H 63/32 184/11.1 |
| 6,164,151 | A * | 12/2000 | Dutson | F16H 63/32 192/82 R |
| 6,179,040 | B1 * | 1/2001 | Aoki | F16H 63/32 164/113 |
| 6,318,205 | B1 * | 11/2001 | Steinberger | F16H 63/36 74/473.36 |
| 6,318,206 | B1 * | 11/2001 | Kramer | F16H 63/32 74/473.36 |
| 6,374,692 | B1 * | 4/2002 | Steinberger | B21D 35/00 74/473.37 |
| 6,389,919 | B1 * | 5/2002 | Hennequet | F16H 63/20 74/473.37 |
| 8,951,156 | B2 | 2/2015 | Klemm et al. | |
| 2004/0108168 | A1 * | 6/2004 | Bathe | F16H 57/042 184/6.12 |
| 2004/0177714 | A1 * | 9/2004 | Ronge | F16H 63/206 74/473.37 |
| 2004/0187623 | A1 * | 9/2004 | Seuferling | F16H 63/32 74/469 |
| 2005/0166698 | A1 * | 8/2005 | Fanning | F16H 63/206 74/473.25 |
| 2007/0209466 | A1 * | 9/2007 | Garabello | F16H 63/32 74/473.37 |
| 2008/0314187 | A1 * | 12/2008 | Keller | F16H 63/32 74/473.36 |
| 2009/0107279 | A1 * | 4/2009 | Garabello | F16H 63/30 74/473.37 |
| 2009/0114050 | A1 * | 5/2009 | Garabello | F16H 63/32 74/473.37 |
| 2010/0132498 | A1 * | 6/2010 | Ungerathen | F16H 63/32 74/473.36 |
| 2011/0314948 | A1 * | 12/2011 | Schulze | F16H 63/32 74/473.37 |
| 2013/0000437 | A1 * | 1/2013 | Skogward | F16H 63/32 74/473.37 |
| 2016/0061321 | A1 * | 3/2016 | Chung | F16H 63/32 428/663 |

FOREIGN PATENT DOCUMENTS

| | | |
|---|---|---|
| CN | 102282394 A | 12/2011 |
| CN | 104334903 A | 2/2015 |
| DE | 1848789 U | 3/1962 |
| DE | 10212245 A1 | 10/2003 |
| DE | 102007027788 A1 | 12/2008 |
| DE | 102008064221 A1 | 7/2010 |
| DE | 102011054186 A1 | 4/2012 |
| DE | 102014104610 A1 | 10/2014 |
| EP | 0878646 A1 | 11/1998 |
| EP | 1260740 A2 | 11/2002 |
| JP | S5379989 U | 7/1978 |
| JP | H0839183 A | 2/1996 |
| WO | 2004079232 A1 | 9/2004 |

OTHER PUBLICATIONS

United States Patent and Trademark Office, U.S. Appl. No. 15/802,537, filed Nov. 3, 2017.

Chinese Office Action dated Apr. 7, 2020, for related Chinese Appln. No. 201811275814.0; 15 Pages.

* cited by examiner

SHIFT FORK AND METHOD OF MANUFACTURE

TECHNICAL FIELD

This disclosure relates to a shift fork and a method of manufacturing a shift fork.

BACKGROUND

A shift fork is disclosed in U.S. Pat. No. 8,951,156.

SUMMARY

In at least one embodiment, a shift fork is provided. The shift fork may include a rod that extends from a first end surface to a second end surface that may be disposed opposite the first end surface. The rod may include a first prong, a second prong, a first intermediate segment, a second intermediate segment, and a ring portion. The first prong may extend from the first end surface to the first intermediate segment. The second prong may extend from the second end surface to the second intermediate segment. The second prong may be spaced apart from the first prong and may cooperate with the first prong to define an opening that may be adapted to receive a clutch collar. The ring portion may define a hole and may extend from the first intermediate segment to the second intermediate segment. The first intermediate segment may or may not contact the second intermediate segment.

In at least one embodiment, a method of making a shift fork is provided. The method may include providing a rod that may extend from a first end surface to a second end surface that may be disposed opposite the first end surface. The rod may be bent to form a first prong, a second prong, and a ring portion. The first prong may extend from the first end surface to a first intermediate segment. The second prong may be spaced apart from the first prong and may extend from the second end surface to the second intermediate segment. The second prong may cooperate with the first prong to define an opening that may be adapted to receive a clutch collar. The ring portion may define a hole and may extend from the first intermediate segment to the second intermediate segment.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
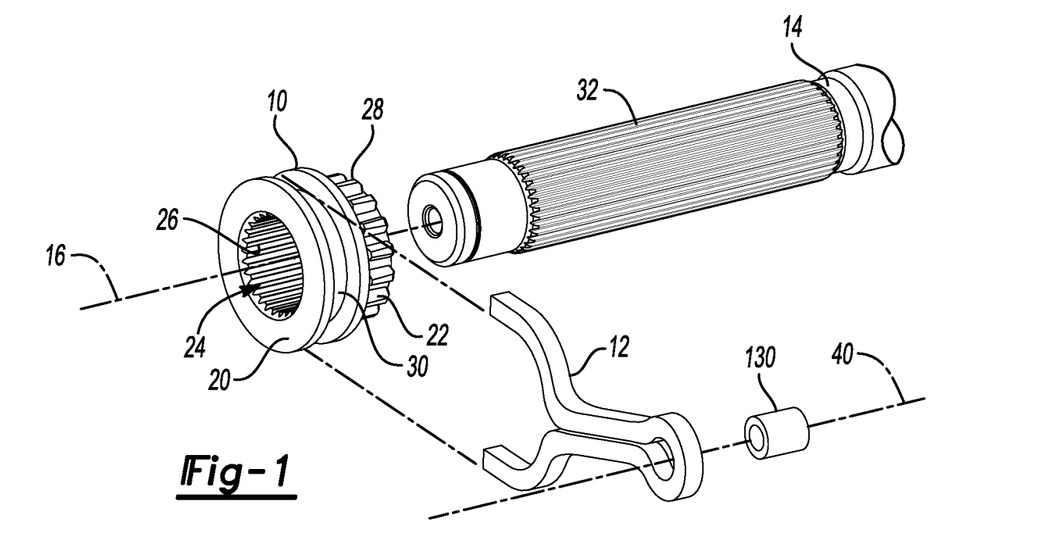
FIG. 1 is an exploded view of examples of a clutch collar, shift fork, and a shaft.

Referring to FIG. 1, a clutch collar 10 and a shift fork 12 are shown. The clutch collar 10 and the shift fork 12 may be provided in various applications. For instance, the clutch collar 10 and the shift fork 12 may be provided with a drivetrain component of a vehicle, such as an axle assembly, transfer case, or the like.

The clutch collar 10, which may also be referred to as a lock collar, may be movably disposed on a shaft 14 that may be rotatable about a first axis 16. For instance, the clutch collar 10 may be movable in an axial direction or movable along the first axis 16. The clutch collar 10 may be movable between at least two positions, such as an engaged position and a disengaged position. In the engaged position, the clutch collar 10 may transmit torque between the shaft 14 and another component to which the clutch collar 10 is engaged. Examples of the component to which the clutch collar 10 may be selectively engaged include, but are not limited to, a differential case, interaxle differential unit, housing, gear, coupling, or the like. The clutch collar 10 may be generally ring-shaped and may include a first side 20, a second side 22, a hole 24, a spline 26, at least one set of engagement teeth 28, and an annular groove 30.

The first side 20 may be disposed at a first end of the clutch collar 10. The first side 20 may be disposed substantially perpendicular to the first axis 16 in one or more configurations.

The second side 22 may be disposed opposite the first side 20. The second side 22 may be disposed substantially perpendicular to the first axis 16 and/or substantially parallel to the first side 20 in one or more configurations.

The hole 24 may extend between the first side 20 and the second side 22. For example, the hole 24 may extend along and may be radially disposed about the first axis 16. The hole 24 may receive the shaft 14.

The spline 26 may be disposed in the hole 24. In at least one configuration, the spline 26 may have a set of spline teeth. The spline teeth may be disposed in the hole 24 and may extend between the first side 20 and the second side 22. In addition, the spline teeth may be arranged around the first axis 16 and may extend toward the first axis 16. The spline teeth may be spaced apart from each other such that a gap is provided between adjacent spline teeth. The spline teeth may mate with a corresponding shaft spline 32 or corresponding teeth on the shaft 14 so that the clutch collar 10 and the shaft 14 may rotate together about the first axis 16 while permitting axial movement of the clutch collar 10 along the shaft 14.

At least one set of engagement teeth 28 may be provided with the clutch collar 10. For instance, a set of engagement teeth 28 may be arranged around the hole 24 and may extend axially from the first side 20, the second side 22, or both. In such a configuration, the set of engagement teeth may form a face gear. Alternatively or in addition, a set of engagement teeth 28 may be arranged around the hole 24 and may extend radially outward from an outer surface or outside circumference of the clutch collar 10 that may be disposed opposite the hole 24. In such a configuration, the set of engagement teeth 28 may extend away from the first axis 16 and a hole 24 and may extend axially between the first side 20 and the second side 22. The engagement teeth 28 may selectively engage and mate with the teeth of another component when the clutch collar 10 is in the engaged position to transmit torque between the shaft 14 and the component via the clutch collar 10. The engagement teeth 28 may disengaged and may be spaced apart from the teeth of the other component when the clutch collar 10 is in the disengaged position.

The annular groove 30 may be axially positioned between the first side 20 and the second side 22. The annular groove 30 may extend continuously around the first axis 16 and may extend from an outer surface or outside circumference of the clutch collar 10 toward the hole 24. The annular groove 30 may be configured to receive the shift fork 12. The clutch collar 10 may rotate about the first axis 16 with respect to the shift fork 12.

The shift fork 12 may be configured to move the clutch collar 10 along the first axis 16. For example, the shift fork 12 may be operatively connected to an actuator that may move the shift fork 12 along a second axis 40, which may also be called a shift fork axis, that may be disposed substantially parallel to the first axis 16. Accordingly, the actuator may actuate the shift fork 12, which in turn may actuate the clutch collar 10.

Figure 2:
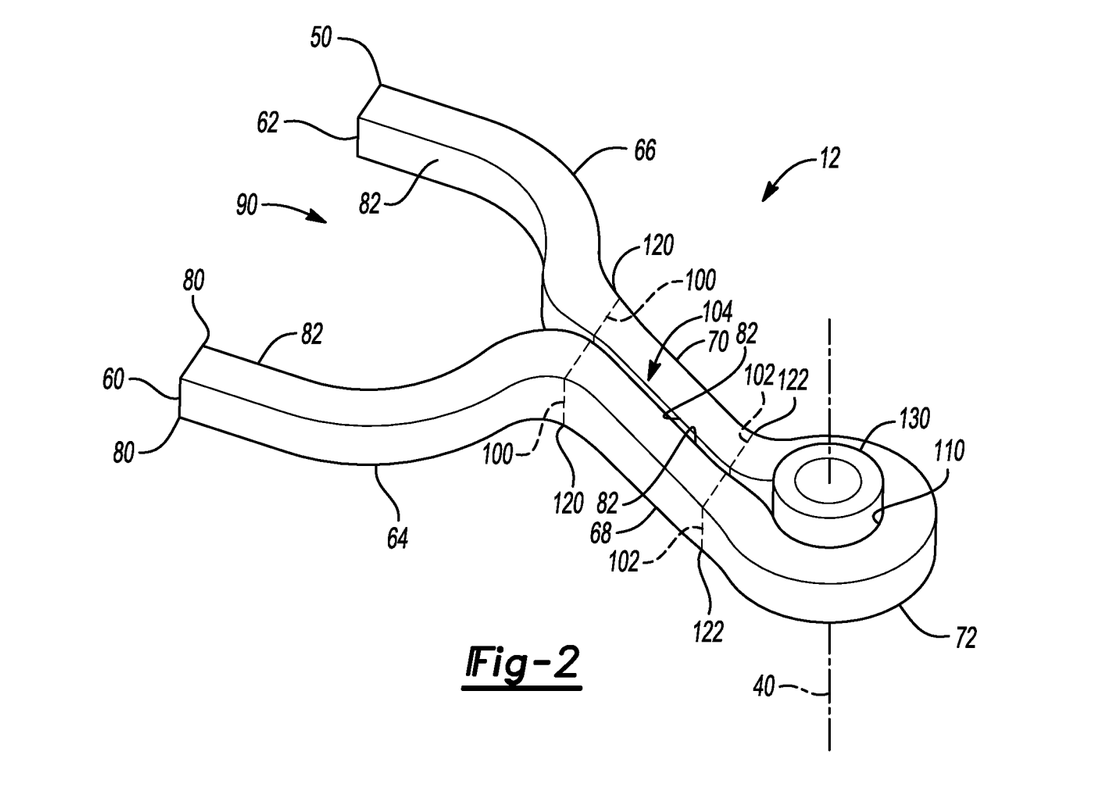
FIG. 2 is a perspective view of the shift fork shown in FIG. 1.

Referring to FIGS. 1 and 2, the shift fork 12 may be made from a rod 50. The rod 50 may be made of any suitable material, such as a metal alloy like steel. For example, spring steel or a spring steel wire may be used. The rod 50 may be bent to form the shape of the shift fork 12, which may include bending a portion of the rod 50 into engagement or contact with itself as will be discussed in more detail below. In at least one configuration, the rod 50, and hence the shift fork 12, may include a first end surface 60, a second end surface 62, a first prong 64, a second prong 66, a first intermediate segment 68, a second intermediate segment 70, and a ring portion 72.

Figure 3:
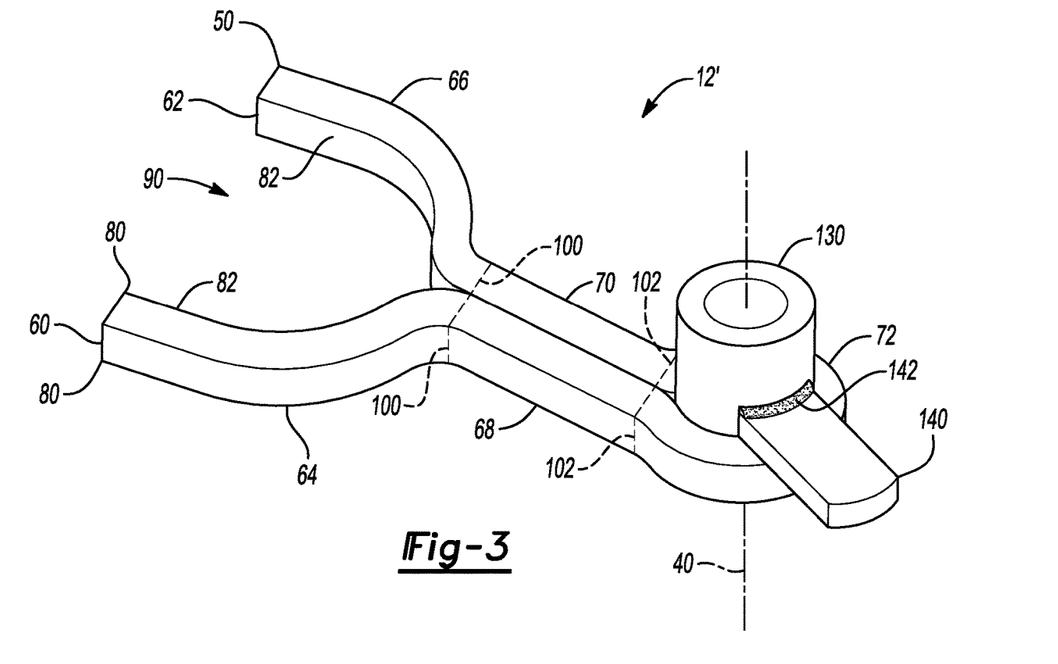
FIG. 3 is a perspective view of another configuration of a shift fork.

Referring to FIGS. 2 and 3, the first end surface 60 may be disposed at a first end of the rod 50.

The second end surface 62 may be disposed at a second end of the rod 50. The second end surface 62 may be disposed opposite the first end surface 60.

In at least one configuration, the rod 50 may have a constant or substantially constant cross-section between the first end surface 60 and the second end surface 62 or from the first end surface 60 to the second end surface 62. The rod 50 may have any suitable cross-sectional shape, such as a circular cross section, oval cross section, triangular cross section, quadrilateral cross section (e.g., rectangular cross section, trapezoid cross section, square cross section, etc.), or the like. Regardless of the cross-sectional shape, the rod 50 may have an exterior perimeter or exterior surface 80 that may extend from the first end surface 60 to the second end surface 62. The exterior surface 80 may refer to the surface that extends around the exterior of the rod 50 from the first end surface 60 to the second end surface 62 that defines the cross-sectional perimeter of the rod 50. The exterior surface 80 may include one or more sides, such as may be provided with a rod 50 that has a cross-section that includes multiple linear segments that bound or define its cross-sectional perimeter. For instance, a triangular cross-section may include three sides, a quadrilateral cross-section may include four sides, and so on. A side that faces toward the clutch collar 10, a hole in the ring portion 72, or both may be referred to as an interior side 82. The interior side 82 may extend from the first end surface 60 to the second end surface 62 and therefore may be provided with and extend along the first end surface 60, second end surface 62, first prong 64, second prong 66, first intermediate segment 68, second intermediate segment 70, and the ring portion 72.

The first prong 64 may extend from the first end surface 60 to the first intermediate segment 68. In addition, the first prong 64 may be spaced apart from other portions of the rod 50, such as the second prong 66, the second intermediate segment 70, the ring portion 72, or combinations thereof. The first prong 64 may be curved or may extend along an arc between the first end surface 60 and the first intermediate segment 68. As such, the first prong 64 may be disposed further away from the second prong 66 at the first end surface 60 than at the first intermediate segment 68.

The second prong 66 may extend from the second end surface 62 to the second intermediate segment 70. In addition, the second prong 66 may be spaced apart from other portions of the rod 50, such as the first prong 64, the first intermediate segment 68, the ring portion 72, or combinations thereof. In at least one configuration, the second prong 66 may be configured as a mirror image of the first prong 64. The second prong 66 may be curved or may extend along an arc between the second end surface 62 and the second intermediate segment 70.

The first prong 64 and the second prong 66 may cooperate to define an opening 90 that may receive the clutch collar 10. For instance, the first prong 64 and the second prong 66 may be received in the annular groove 30 of the clutch collar 10 such that the clutch collar 10 may be received in the opening 90 between the first prong 64 and the second prong 66. The width of the opening 90 between the first end surface 60 and the second end surface 62 may be slightly wider than the diameter of the bottom surface of the annular groove 30 to facilitate insertion of the shift fork 12 into the annular groove 30.

The first intermediate segment 68 may extend from the first prong 64 to the ring portion 72. For example, the first intermediate segment 68 may have a first intermediate segment end 100 and a second intermediate segment end 102. The first prong 64 may extend from the first intermediate segment end 100. The second intermediate segment end 102 may be disposed opposite the first intermediate segment end 100. The ring portion 72 may extend from the second intermediate segment end 102. The first intermediate segment 68 may be separate from or spaced apart from the second prong 66.

The second intermediate segment 70 may extend from the second prong 66 to the ring portion 72. For example, the second intermediate segment 70 may have a first intermediate segment end 100 and a second intermediate segment end 102 like the first intermediate segment 68. The second prong 66 may extend from the first intermediate segment end 100 of the second intermediate segment 70. The second intermediate segment end 102 of the second intermediate segment 70 may be disposed opposite the first intermediate segment end 100 of the second intermediate segment 70. The ring portion 72 may extend from the second intermediate segment end 102 of the second intermediate segment 70. The second intermediate segment 70 may be separate from or spaced apart from the first prong 64. The second intermediate segment 70 may be configured as a mirror image of the first intermediate segment 68 in one or more configurations. In addition, the first intermediate segment 68 may be disposed substantially parallel to the second intermediate segment 70.

Referring to FIG. 2, the first intermediate segment 68 may be spaced apart from and may not contact the second intermediate segment 70. As such, a gap 104 may be provided between the first intermediate segment 68 and the second intermediate segment 70. The gap 104 may extend from the opening 90 to the ring portion 72. It is contemplated that the first intermediate segment 68 may be spaced apart from and may not contact the second intermediate segment 70 in other configurations, such as the configurations shown in FIGS. 3 and 5.

Referring to FIG. 3, the first intermediate segment 68 may engage or may contact the second intermediate segment 70. For example, the first intermediate segment 68 may engage the second intermediate segment 70 between the ring portion 72 and the opening 90. In at least one configuration, the first intermediate segment 68 may continuously engage or continuously contact the second intermediate segment 70 between the first prong 64 and the ring portion 72 and between the second prong 66 and the ring portion 72. As such, the exterior surface 80 or interior side 82 of the first intermediate segment 68 and the exterior surface 80 or interior side 82 of the second intermediate segment 70 may contact each other from the ring portion 72 to the first prong 64, the second prong 66, or both. Moreover, the interior side 82 of the first intermediate segment 68 may face toward and may engage or contact the interior side 82 of the second intermediate segment 70 in configurations where the exterior surface 80 includes an interior side 82. As such, the first intermediate segment 68 may contact by may be separate from the second intermediate segment 70, which differs from a shift fork that has a unitary one-piece configuration in which the prongs extend from a single segment that has no parting line that divides the shift fork between the prongs and a ring portion. It is contemplated that the first intermediate segment 68 may contact the second intermediate segment 70 in other configurations, such as the configuration shown in FIG. 2.

The ring portion 72 may extend from the first intermediate segment 68 to the second intermediate segment 70. For instance, the ring portion 72 may have a first ring portion end and a second ring portion end. The first ring portion end may extend from the second intermediate segment end 102 of the first intermediate segment 68. The second ring portion end may extend from the second intermediate segment end 102 of the second intermediate segment 70. The ring portion 72 may have a curved or generally circular configuration that may at least partially define a hole 110. The hole 110 may be centered about and may extend along a second axis 40. The ring portion 72 may be operatively connected to the actuator. For instance, the hole 110 may receive a shift rail or a shaft that may extend from or may be operatively connected to the actuator. The exterior surface 80 or interior side 82 of the ring portion 72 may extend around and may define the interior of the hole 110. More specifically, at least a portion of the exterior surface 80 or interior side 82 that is provided with the ring portion 72 may face toward the second axis 40 and may be radially disposed around the second axis 40 or disposed at a substantially constant radial distance from the second axis 40.

The first intermediate segment 68 and the second intermediate segment 70 may or may not be disposed in a common plane with the first prong 64, second prong 66, and the ring portion 72.

In the configuration shown in FIG. 2, the shift fork 12 has a nonplanar configuration in which the first prong 64 and the second prong 66 may be offset from the ring portion 72. The first prong 64 and the second prong 66 may be offset from the ring portion 72 by providing one or more bends proximate the first and second intermediate segments 68, 70. For example, the first intermediate segment 68 and the second intermediate segment 70 may each be bent or provided with a first bend 120 that may be located near or at the first prong 64 and the second prong 66. Likewise, the first intermediate segment 68 and the second intermediate segment 70 may each be bent or provided with a second bend 122 that may be located near or at the ring portion 72.

In the configuration shown in FIG. 3, the shift fork 12' as a planar configuration in which the first prong 64 and the second prong 66 are not offset from the ring portion 72. In such a configuration, first and second bends 120, 122 may not be provided.

Referring to FIG. 3, a bearing 130 may be received in the hole 110 in the ring portion 72. The bearing 130 may have any suitable configuration. For example, the bearing 130 may be a journal bearing or bushing that may extend around and may be centered about the second axis 40, which may also be referred to as a hole axis. The bearing 130 may have a ring-like configuration that may extend around a shift rail or a shaft. The bearing 130 may engage the exterior surface 80 or interior side 82 of the ring portion 72 such that the exterior surface 80 or interior side 82 may extend around the bearing 130 and engage the outside circumference of the bearing 130 with an interference fit. Accordingly, the bearing 130 may not rotate with respect to the ring portion 72. It is also contemplated that a bearing 130 may be provided with other shift fork configurations, such as the shift fork 12 that is shown in FIG. 2.

Optionally, an extension plate 140 may extend from bearing 130. The extension plate 140 may be disposed on an opposite side of the bearing 130 from the first intermediate segment 68 and the second intermediate segment 70. The extension plate 140 may be fixedly attached to the bearing 130, the ring portion 72, or both. For example, the extension plate 140 may be attached to the bearing 130, the ring portion 72, or both with one or more welds 142. The extension plate 140 may be disposed on or adjacent to a lateral side of the shift fork 12'. For instance, the extension plate 140 may be axially offset along the second axis 40 from the ring portion 72. It is also contemplated that an extension plate 140 may be provided with the shift fork 12 that is shown in FIG. 2.

Referring to FIGS. 4-7, a method of making a shift fork will now be described. As an overview, the shift fork may be made by bending a unitary one-piece rod instead of casting the shift fork from molten material, forging a billet of material into a shift fork, or stamping the shift fork out of a sheet of material. The rod may be bend using various techniques. For instance, the rod may be bent around a jig sequentially from one end to the other or multiple portions of the rod may be formed simultaneously. The rod may be bent using a die or fixture or bent using one or more robotic manipulators. There are many possible manufacturing techniques and sequence of steps that may be used to make a shift fork. The examples discussed below discuss some such techniques in more detail.

Referring to FIGS. 4-7 a first example of a method of making a shift fork is depicted.

Figure 4:
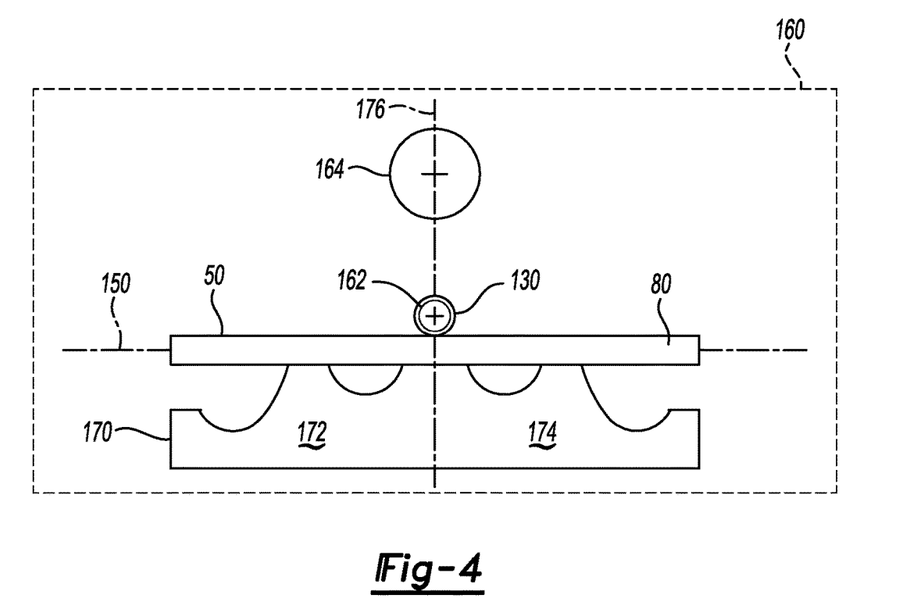
FIGS. 4-7 and 8-11 depict examples of a method of making a shift fork.

First, the rod 50 may be provided. The rod 50 may be a piece of material that may have a predetermined length and/or predetermined cross section from the first end surface 60 to the second end surface 62. For instance, the rod 50 may be a piece of material that is cut from a coil of material or piece of material to the predetermined length. For example, material may be unwound from a coil such that the rod 50 may extend along a substantially linear rod axis 150 and then may be cut to the predetermined length.

Second, the rod 50 may be bent to form the shift fork. As one example, the rod 50 may be positioned on a fixture 160. In at least one configuration, the fixture 160 may have a first mandrel 162 that may form the hole 110 and a second mandrel 164 that may form the first prong 64 and the second prong 66. The first mandrel 162 may be spaced apart from the second mandrel 164, which may allow the first and second intermediate segments 68, 70 to contact each other after the rod 50 is bent. As another option, one or more protrusions, such as a web or wall, may extend between the first mandrel 162 to the second mandrel 164. The first and second intermediate segments 68, 70 may be compressed against the web or wall during bending or forming to help provide the gap 104. The rod 50 may be positioned such that the center of the rod 50 between the first end surface 60 and the second end surface 62 may be positioned on or adjacent to the first mandrel 162. Optionally, a bearing 130 may be positioned on the first mandrel 162 such that the bearing 130 receives the first mandrel 162 and the bearing 130 is positioned on or adjacent to the center of the rod 50.

A forming die 170 may be provided that may bend the rod 50. For instance, the forming die 170 may include one or more contoured surfaces that may engage the rod 50 to form the rod 50 into the desired shape. As one example, the forming die 170 may include a first die portion 172 and a second die portion 174. The first die portion 172 and the second die portion 174 may be configured as mirror images of each other in one or more embodiments. The first die portion 172 and the second die portion 174 may be actuated bowl from an open position to a closed position, either sequentially or simultaneously. In FIG. 4, the first die portion 172 and the second die portion 174 are shown in the open position with the rod 50 disposed between the first mandrel 162 and the forming die 170. Optionally, the rod 50 may be heated to a temperature below its melting point to facilitate bending before bending or being positioned in the forming die 170.

Figure 5:
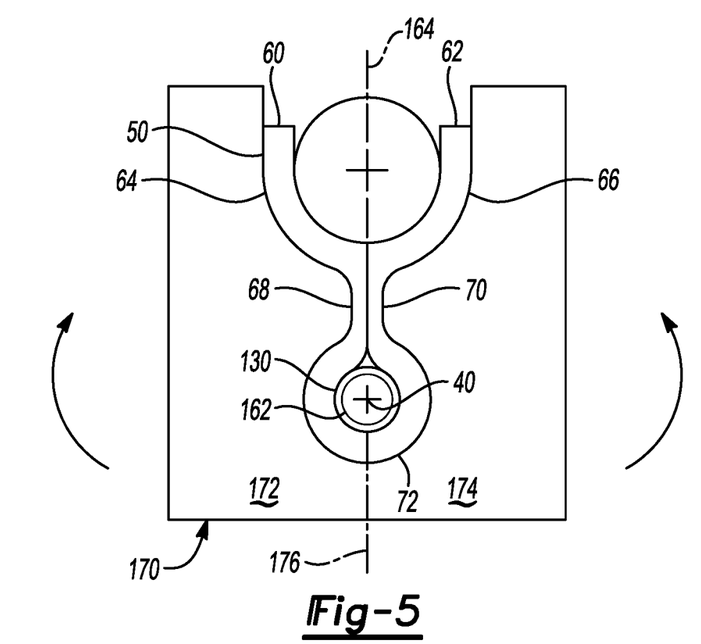

The forming die 170 may be actuated to the closed position as shown in FIG. 5. For example, the first die portion 172 and the second die portion 174 may be pivoted simultaneously or sequentially to bring the distal ends of the first die portion 172 and the second die portion 174 closer to each other. Closing the forming die 170 may exert a compressive force on the rod 50. More specifically, closing the forming die 170 may bend or wrap the rod 50 around the first mandrel 162 and the bearing 130 if provided, thereby forming the ring portion 72 and securing the bearing to the ring portion 72 with an interference fit. In addition, the forming die 170 may compress the rod 50 against the second mandrel 164, thereby forming the first prong 64 and the second prong 66.

The forming die 170 may also compress and bend the rod 50 such that the first intermediate segment 68 and the second intermediate segment 70 are pushed toward each other and toward a center plane 176. The center plane 176 may bisect the shift fork in one or more configurations. The first intermediate segment 68 may or may not contact the second intermediate segment 70. For example, the first intermediate segment 68 may contact the second intermediate segment 70, but may be detached from the second intermediate segment 70 after closing the forming die 170 and bending the rod 50. As such, the first and second intermediate segments 68, 70 may contact each other but may be separate from each other along the center plane 176, such as when the shift form is symmetrical with respect to opposite sides of the center plane 176. Alternatively, the first intermediate segment 68 and the second intermediate segment 70 may not contact each other and a gap 104 may be provided between the first intermediate segment 68 and the second intermediate segment 70. The gap 104 may extend from the opening 90 to the hole 110 and may be disposed along the center plane 176 in one or more configurations.

In at least one configuration, the ring portion 72 may be at least partially formed before the first prong 64 and the second prong 66 are formed or before the rod 50 engages the second mandrel 164. In addition, the first prong 64 and the second prong 66 may be formed before the first intermediate segment 68 and the second intermediate segment 70 are completely formed or contact each other.

Figure 6:
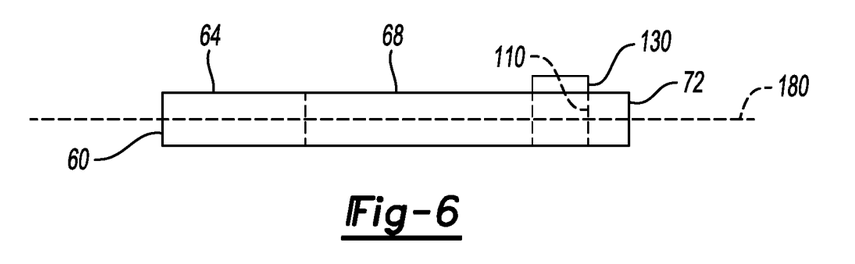

Referring to FIG. 6, the shift fork is shown after being removed from the forming die 170 with the first prong 64, second prong 66, first intermediate segment 68, second intermediate segment 70, and the ring portion 72 disposed in a common plane 180 that may bisect the shift fork, thereby providing a shift fork with a planar configuration such as is shown in FIG. 3.

Figure 7:
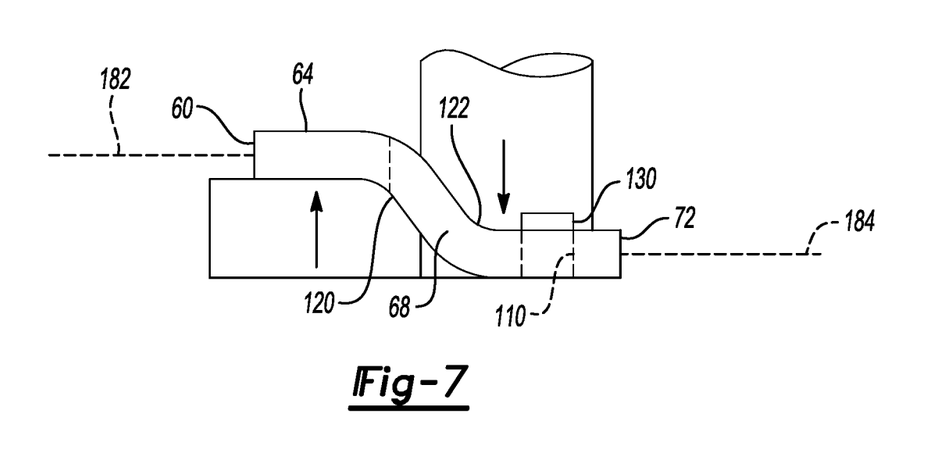

The shift fork may undergo further bending to provide a nonplanar configuration. For instance, the shift fork may be bent in the fixture 160 or after removal from the fixture 160 and forming die 170. The shift fork may be bent using a press or other bending apparatus to offset the first prong 64 and the second prong 66 from the ring portion 72 to provide a configuration such as is shown in FIG. 1. For instance, the rod 50 may be bent at one or more locations proximate the first intermediate segment 68 and the second intermediate segment 70 to position the first prong 64 and the second prong 66 in the first plane 182 and to position the ring portion 72 in a second plane 184 that differs from the first plane 182. The first plane 182 may be disposed substantially parallel to the second plane 184 such that the first plane 182 and the second plane 184 may not intersect.

Referring to FIGS. 8-11 a first example of a method of making a shift fork is depicted. In this example, arrows are provided to depict the direction in which the rod 50 is bent without showing all of the associated components or surfaces that may contact the rod 50 to execute a bend.

Figure 8:
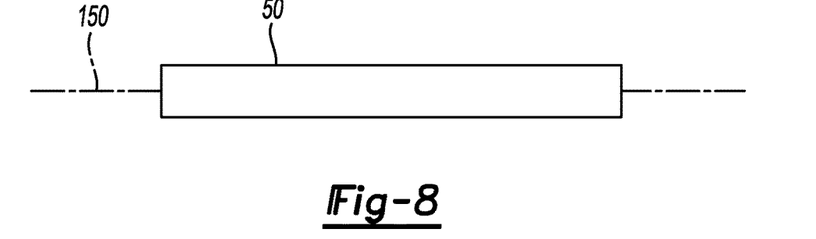

Referring to FIG. 8, the rod 50 may be provided as previously described.

Figure 9:
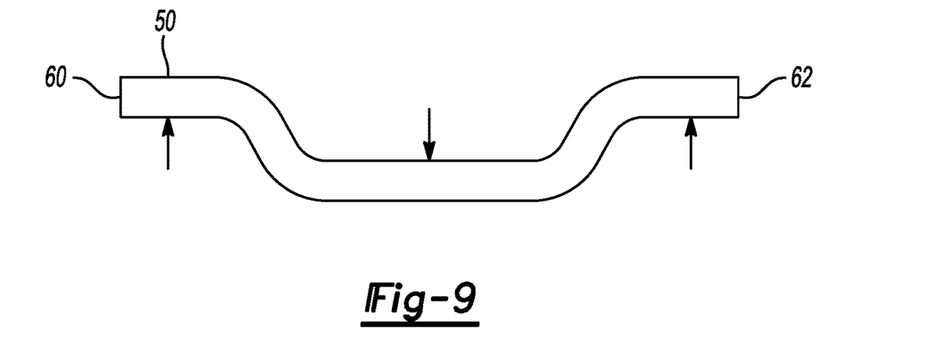

Referring to FIG. 9, the rod 50 may be bent to at least partially form the first and second prongs 64, 66. For instance, the rod 50 may be bent in a press to offset the first and second prongs 64, 66 from the middle of the rod 50 that will eventually be formed into the ring portion 72 and the first and second intermediate segments 68, 70. As such, the first and second prongs 64, 66 may be at least partially formed before the ring portion 72 is completely formed.

Figure 10:
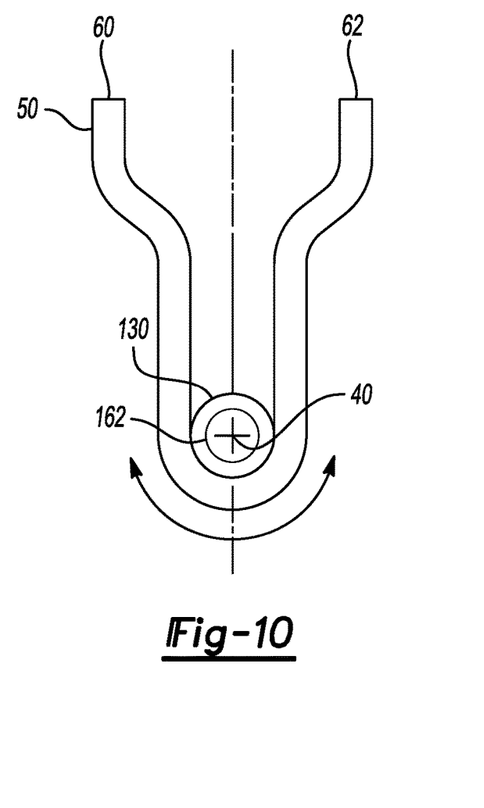

Referring to FIG. 10, the rod 50 may be bent to partially form the ring portion 72 and to align the first prong 64 with the second prong 66. For instance, the rod 50 may be transferred to another press or fixture and may be turned over. The rod 50 may be bent or wrapped at least partially around the first mandrel 162 and the bearing 130 if provided, thereby at least partially forming the ring portion 72 and helping secure the bearing to the ring portion 72. In addition, the first prong 64 and the second prong 66 may be repositioned to extend generally parallel to each other as mirror images of each other.

Figure 11:
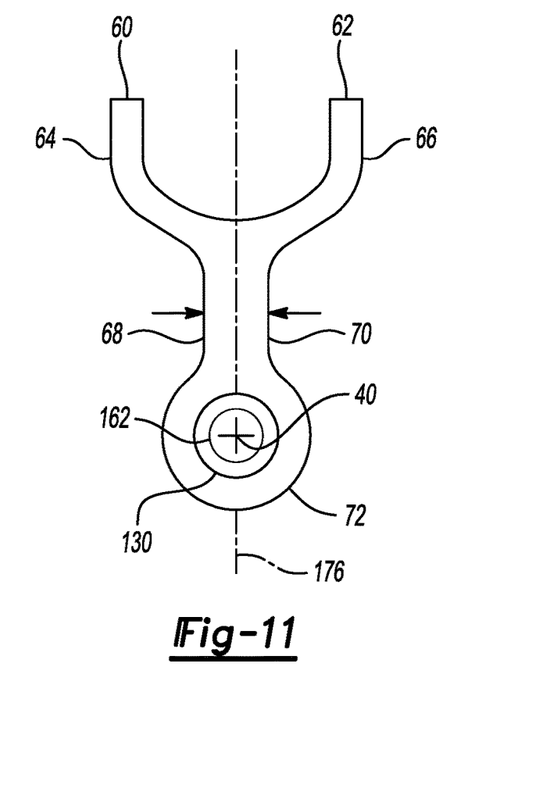

Referring to FIG. 11, the rod 50 may be further bent or formed such that the first intermediate segment 68 and the second intermediate segment 70 are pushed toward each other and toward a center plane 176. The first intermediate segment 68 may or may not contact the second intermediate segment 70 as previously discussed. This step may help further secure the bearing 130, if provided, and may move the first and second prongs 64, 66 closer to each other and closer to the center plane 176.

The shift fork may undergo further bending to provide a nonplanar configuration as previously described if the shift fork is to have a non-planar configuration.

Regardless of the specific bending method or sequence, various optional steps may be included in the method. For instance, a weld may be provided to join the first intermediate segment 68 to the second intermediate segment 70 after bending. As another option, the shift fork may be hardened and quenched after bending and forming operations are complete to provide a desired material hardness or other mechanical properties if the rod 50 was heated prior to bending.

Providing a shift fork that is made by bending a rod as described above may provide a shift fork that is not cast, forged or stamped. Accordingly, a shift fork that is made by bending may be manufactured at a lower cost and reduced capital investment than a shift fork made by other manufacturing techniques. A shift fork that is made by bending may also allow different shift fork configurations to be made by adjusting bending parameters or bending hardware, which may reduce development costs and manufacturing costs. In addition, a shift fork that is made by bending a rod may allow the shift fork to be manufactured with a material having a constant cross-sectional thickness. This cross-sectional thickness may be less than the cross-sectional thickness of a shift fork may by other manufacturing techniques, which may help reduce the weight of the shift fork. Furthermore, a shift fork made by bending a rod as described above may improve the capability of the shift fork to withstand stresses and reduce bending fatigue in various locations, such as near the prongs and along the intermediate portions, thereby improving durability and shift fork life.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A shift fork assembly comprising:
   a rod that extends from a first end surface to a second end surface that is disposed opposite the first end surface, wherein the rod includes:
   a first prong that extends from the first end surface to a first intermediate segment;
   a second prong that extends from the second end surface to a second intermediate segment, the second prong being spaced apart from the first prong and cooperating with the first prong to define an opening that receives a clutch collar such that the first prong and the second prong contact the clutch collar; and
   a ring portion that defines a hole and extends from the first intermediate segment to the second intermediate segment, wherein the first intermediate segment contacts the second intermediate segment.

2. The shift fork assembly of claim 1 wherein the first intermediate segment engages the second intermediate segment between the ring portion and the opening and is spaced apart from the second prong.

3. The shift fork assembly of claim 1 wherein the rod has an exterior surface, wherein the exterior surface of the first intermediate segment and the exterior surface of the second intermediate segment contact each other from the ring portion to the first prong.

4. The shift fork assembly of claim 1 wherein the rod has an interior side that extends from the first end surface to the second end surface, wherein the interior side of the first intermediate segment faces toward and engages the interior side of the second intermediate segment and the interior side defines an interior of the hole.

5. The shift fork assembly of claim 1 wherein the rod has a square cross section that has an interior side that extends from the first end surface to the second end surface, wherein the interior side of the first intermediate segment faces toward and engages the interior side of the second intermediate segment.

6. The shift fork assembly of claim 5 wherein the interior side defines the hole.

7. The shift fork assembly of claim 1 wherein the first prong, second prong, first intermediate segment, second intermediate segment, and the ring portion are disposed in a plane.

8. A shift fork assembly comprising:
   a rod that extends from a first end surface to a second end surface that is disposed opposite the first end surface, wherein the rod includes:
   a first prong that extends from the first end surface;
   a second prong that extends from the second end surface, the second prong being spaced apart from the first prong and cooperating with the first prong to define an opening that receives a clutch collar, wherein the first prong and the second prong contact the clutch collar; and
   a ring portion that defines a hole and is positioned between the first prong and the second prong.

9. The shift fork assembly of claim 8 wherein the first prong is a mirror image of the second prong.

10. The shift fork assembly of claim 8 wherein a first intermediate segment has a first intermediate segment end that extends from the first prong and a second intermediate portion end that is disposed opposite the first intermediate segment end and extends to the ring portion.

11. The shift fork assembly of claim 10 wherein a second intermediate segment has a first intermediate segment end that extends from the second prong and a second intermediate portion end that is disposed opposite the first intermediate segment end of the second intermediate segment and extends to the ring portion such that the ring portion extends from the second intermediate segment end of the first intermediate segment to the second intermediate segment end of the second intermediate segment.

12. The shift fork assembly of claim 11 wherein the first intermediate segment is disposed substantially parallel to the second intermediate segment.

13. The shift fork assembly of claim 11 wherein the first prong, second prong, first intermediate segment, second intermediate segment, and the ring portion are disposed in a plane.

14. The shift fork assembly of claim 11 wherein the first prong and the second prong are disposed in a first plane and the ring portion is disposed in a second plane that is disposed substantially parallel to the first plane.

15. A shift fork assembly comprising:
    a rod that extends from a first end surface to a second end surface that is disposed opposite the first end surface, wherein the rod includes:
    a first prong that extends from the first end surface to a first intermediate segment;
    a second prong that extends from the second end surface to a second intermediate segment, the second prong being spaced apart from the first prong and cooperating with the first prong to define an opening that receives a clutch collar, wherein the first prong and the second prong contact the clutch collar and are received in an annular groove of the clutch collar; and a ring portion that defines a hole and extends from the first intermediate segment to the second intermediate segment, wherein the first intermediate segment contacts the second intermediate segment.

16. The shift fork assembly of claim 15 wherein the first intermediate segment has a first intermediate segment end and a second intermediate segment end disposed opposite the first intermediate segment end, wherein the first prong extends from the first intermediate segment end and the ring portion extends from the second intermediate segment end.

17. The shift fork assembly of claim 16 wherein the second intermediate segment has a first intermediate segment end and a second intermediate segment end disposed opposite the first intermediate segment end, wherein the second prong extends from the first intermediate segment end of the second intermediate segment and the ring portion extends from the second intermediate segment end of the second intermediate segment.

18. The shift fork assembly of claim 17 wherein a bearing is received in the hole and engages the ring portion.

19. The shift fork assembly of claim 18 wherein an extension plate extends from the bearing and is disposed on an opposite side of the bearing from the first intermediate segment and the second intermediate segment.

20. The shift fork assembly of claim 19 wherein the bearing protrudes from the ring portion and the extension plate contacts the ring portion and an outside circumferential surface of the bearing.

* * * * *